United States Patent
Yao et al.

(10) Patent No.: US 8,134,809 B2
(45) Date of Patent: Mar. 13, 2012

(54) DISK DRIVE HEAD GIMBAL ASSEMBLY INCLUDING A PZT MICRO-ACTUATOR WITH A PAIR OF SEPARATE PZT ELEMENTS

(75) Inventors: MingGao Yao, Dongguan (CN); Lin Guo, Dongguan (CN); Yu Sun, Dongguan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 983 days.

(21) Appl. No.: 12/081,699

(22) Filed: Apr. 18, 2008

(65) Prior Publication Data

US 2009/0195938 A1    Aug. 6, 2009

(30) Foreign Application Priority Data

Feb. 2, 2008   (CN) .......................... 2008 1 0080407

(51) Int. Cl.
*G11B 5/56* (2006.01)
*G11B 21/24* (2006.01)
(52) U.S. Cl. .................................................. 360/294.4
(58) Field of Classification Search ............... 360/294.4, 360/234.5, 234.6, 245.3, 245.5
See application file for complete search history.

(56) References Cited

U.S. PATENT DOCUMENTS

| | | | |
|---|---|---|---|
| 7,006,334 B2* | 2/2006 | Uchiyama | 360/294.4 |
| 7,068,474 B2* | 6/2006 | Kuwajima et al. | 360/294.4 |
| 2007/0211390 A1* | 9/2007 | Yamamoto et al. | 360/294.4 |
| 2007/0274008 A1* | 11/2007 | Li | 360/294.4 |
| 2008/0106824 A1* | 5/2008 | Li | 360/294.4 |

\* cited by examiner

*Primary Examiner* — Jefferson Evans
(74) *Attorney, Agent, or Firm* — Nixon & Vanderhye PC

(57) ABSTRACT

A PZT micro-actuator for a head gimbal assembly includes a pair of separate PZT elements and each PZT element has a body and a plurality of electrical pads. The body has at least two electrode-piezoelectric combination layers laminated together. The at least two electrode-piezoelectric combination layers are physically connected with but electrically isolated from each other. Each electrode-piezoelectric combination layer has at least two of the electrical pads thereon. The electrical pads extend out from the body of the corresponding PZT element. All the electrical pads of each PZT element are offset a predetermined distance therebetween to be electrically isolated. The present invention also discloses a head gimbal assembly (HGA) with the PZT micro-actuator, an assembling method for the head gimbal assembly and a disk drive unit having such HGA.

16 Claims, 14 Drawing Sheets

US 8,134,809 B2

DISK DRIVE HEAD GIMBAL ASSEMBLY INCLUDING A PZT MICRO-ACTUATOR WITH A PAIR OF SEPARATE PZT ELEMENTS

This application claims priority to Chinese Application No. 200810080407.4 filed Feb. 2, 2008, the entire contents of which are hereby incorporated by reference.

FIELD OF THE INVENTION

The present invention relates to an information recording disk drive device, and more particularly, to a piezoelectric (PZT) micro-actuator, a head gimbal assembly (HGA) with the PZT micro-actuator, an assembling method for the HGA, and a disk drive device with the HGA.

BACKGROUND OF THE INVENTION

Disk drives are information storage devices that use magnetic media to store data and a movable read/write head positioned over the magnetic media to selectively read data from and write data to the magnetic media.

Consumers are constantly desiring greater storage capacity for such disk drive devices, as well as faster and more accurate reading and writing operations. Thus, disk drive manufacturers have continued to develop higher capacity disk drives by, for example, increasing the recording and reproducing density of the information tracks on the disks by using a narrower track width and/or a narrower track pitch. However, each increase in track density requires that the disk drive device have a corresponding increase in the positional control of the read/write head in order to enable quick and accurate reading and writing operations using the higher density disks. As track density increases, it becomes more and more difficult to quickly and accurately position the read/write head over the desired information tracks on the disk. Thus, disk drive manufacturers are constantly seeking ways to improve the positional control of the read/write head in order to take advantage of the continual increases in track density. One common approach is to employ a dual-stage actuator system.

FIGS. 1-2 show a conventional disk drive unit having dual-stage actuator system. Such dual-stage actuator system includes a primary actuator such as a voice-coil motor (VCM) 107 and a secondary micro-actuator such as a PZT micro-actuator 105. A disk 101 of the disk drive unit is mounted on a spindle motor 102 for spinning the disk 101. A voice coil motor arm 104 carries a head gimbal assembly (HGA) 100 that includes a slider 103, the PZT micro-actuator 105 and a suspension 106 to support the slider 103 and the PZT micro-actuator 105. A read/write head is embedded in the slider 103.

The voice-coil motor 107 as the primary actuator controls the motion of the voice coil motor arm 104 and, in turn, controls the slider 103 to position with reference to data tracks across the surface of the disk 101, thereby enabling the read/write head to read data from or write data to the disk 101. As compared to the voice-coil motor 107, the PZT micro-actuator 105 corrects the displacement of the slider 103 on a much smaller scale in order to compensate for the resonance tolerance of the VCM and/or the HAA (head arm assembly). Therefore, the PZT micro-actuator 105 enables, for example, the use of a smaller recording track pitch, and thus increases the "tracks-per-inch" (TPI) value for the disk drive unit, as well as provides an advantageous reduction in the head seeking and settling time. Thus, the PZT micro-actuator 105 enables the disk drive unit to have a significant increase in the surface recording density of the information storage disks used therein.

FIGS. 3-4 illustrate the HGA 100 with dual-stage actuator system in the conventional disk drive unit shown in FIGS. 1-2. The suspension 106 of the HGA 100 comprises a flexure 122 having a plurality of traces, a slider support 121, a metal base 123 and a suspension load beam 124 having a dimple 125 to support the slider support 121 and the metal base 123. The flexure 122 connects the slider support 121 with the metal base 123 via the traces. The flexure 122 has a PZT mounting region 128 for mounting the PZT micro-actuator 105 and a slider mounting region 129 at a tongue region thereof. The slider 103 is partially mounted on the slider support 121 via the slider mounting region 129. The slider support 121 forms a bump 127 thereon to support the center of the back surface of the slider 103. The dimple 125 of the suspension load beam 124 supports the bump 127 of the slider support 121, which enables that the load force from the load beam 114 evenly applies to the center of the slider 103 when the slider 103 flies over the disk 101. The PZT micro-actuator 105 comprises two thin film PZT elements 10 which are connected with each other. The two thin film PZT elements 10 are mounted on the PZT mounting region 128 of the flexure 122.

As shown in FIG. 5, when a voltage is input to the two thin film PZT elements 10, one of the PZT elements may contract while the other may expand, thus making the slider support 121 and the slider 103 rotate against the dimple 125 of the suspension load beam 124, thereby achieving a smaller adjustment for the displacement of the slider 103. The deformation function of the PZT elements 10 is determined by the structure of the PZT elements themselves. Referring to FIG. 5a, a typical PZT element has multiple PZT layers such as PZT layers 702, 703 laminating together to form a layered structure and each PZT layer is sandwiched between a pair of positive-negative electrode layers 704/705, 706/707. The positive layers 704, 707 of the PZT layers 702, 703 connect with each other by sputtering process at the inner of the layered structure to form a positive electrode of each PZT element. Similarly, the negative layers 705, 706 of the PZT layers 702, 703 also connect with each other by sputtering process at the inner of the layered structure to form a negative electrode of each PZT element. The positive electrode and negative electrode of each PZT element 10 respectively forms an electrical pad 131, 132. Shown in FIG. 4, after the electrical pads 131, 132 of the PZT elements 10 are respectively and electrically connected (usually gold trace bonding) with the electrical pads 133, 134 formed on the flexure 122, the PZT elements could be driven to operate by applying voltage to electrical pads 133, 134.

In addition, as shown in FIGS. 3, 4 and 5a, the present PZT actuator 105 is primarily formed by two symmetrical PZT elements 10 connected with each other. The two identical PZT elements 10 are mechanically connected by a thin material thus to be mutually combined. For example, the PZT elements 10 connect with each other by a substrate layer 701.

Though the above-mentioned PZT micro-actuator 105 could provide smaller scale adjustment for the displacement of the slider, the PZT micro-actuator 105 has some insuperable drawbacks. First, because the present PZT micro-actuator 105 for HAG is formed by two piece PZT elements mechanically connecting with each other via thin material and the mechanical connection in usual cases possesses an extremely low strength at the connection point, the connection point is easy to deform or break in the technological operation or transformation or testing process of the PZT micro-actuator 105, thereby causing the whole PZT micro-actuator 105 damaged. Second, the two piece PZT elements which are integratedly connected with each other easily causes an increase of the manufacture cost. For example, on the one hand, when it is detected that one PZT element is damaged and thus should be discarded while the other PZT element is in a sound condition, the sound PZT element has no choice but to be also discarded as the two piece PZT elements are combined together, thereby causing the increase of the manufacture cost. on the other hand, as mentioned above, the corresponding electrode layers of all the PZT layers in the present PZT element are connected correspondingly (for example, all the positive electrodes are connected together and all the negative electrodes are also connected together). That is, all PZT layers are parallelly connected between one pair of electrode layers, thus it is unable to detect the defect of a single PZT layer. In other words, when one PZT element is damaged, it is impossible to detect which PZT layer of the PZT element is damaged, thereby the whole PZT element has to be discarded. Similarly, as the corresponding electrode layers of all PZT layers are connected correspondingly by sputtering as mentioned above, the manufacture process is complex, further causing a higher manufacture cost.

Another drawback existing in the conventional HGA 100 shown in FIGS. 3, 4 relates to electrical connection method and shock performances. As mentioned above, after the PZT elements 10 are bonded to the HGA 100, the electrical pads 131, 132 of the PZT elements 10 are respectively connected with electrical pads 133, 134 formed on the flexure 122 via gold trace soldering. As the whole structure of gold trace soldering possesses an extremely poor shock performance, it is easy to split or break especially when outer vibration or shock event happens. Hence the whole structure of the HGA 100 has a terribly poor shock performance.

Besides, the prior art has other drawbacks. As the slider support 121 is coupled with the metal base 123 by the traces of the flexure 122 which are only 10-20 um in thickness and formed from soft polymer material, the flexure 122 is easy to distort and accordingly the suspension 106 is likely to deform during the suspension manufacture process, HGA manufacturing and handle process. Moreover, the suspension deformation resulted from such weak structure will adversely cause the suspension or HGA dimple separation. FIGS. 6 and 7 respectively show a suspension deformation and a dimple separation. In addition, as the slider 103 is partially mounted on the slider support 121 and the slider support 121 is coupled with the metal base 123 via traces of the flexure 122, the static attitude of the slider 103 such as PSA (pitch static attitude) or RSA (roll static attitude) is unstable and difficult to control, which causes the HGA performance unstable and accordingly, affects the HGA dynamic performance seriously, especially when a vibration or shock event happens or during the manufacture process or handle process. Finally, such structure makes the whole HGA a poor shock performance. When a vibration or shock event happens, for example tilt drop shock or operation shock, the suspension or the PZT elements of the PZT micro-actuator 105 may be caused to damage.

Hence, it is desired to provide an improved structure to solve the above-mentioned problems.

SUMMARY OF THE INVENTION

Accordingly, an object of the present invention is to provide a PZT micro-actuator for a head gimbal assembly (HGA). The PZT micro-actuator avoids the problem of weak structure existing in the prior art, reduces waste of PZT elements during manufacturing and detecting process and could detect the defect of each PZT layer individually, thereby reducing manufacture cost.

Another object of the present invention is to provide a head gimbal assembly (HGA) with a PZT micro-actuator. The HGA avoids the problem of weak structure existing in the prior art, reduces waste of PZT elements during manufacturing and detecting process and could detect the defect of each PZT layer individually, thereby reducing manufacture cost and improving shock performance of a suspension.

Another object of the present invention is to provide an assembling method for a head gimbal assembly to reduce manufacture cost.

Still another object of the present invention is to provide a disk drive unit to reduce manufacture cost.

To achieve the above-mentioned objects, a PZT micro-actuator for a head gimbal assembly comprises a pair of separate PZT elements and each PZT element has a body and a plurality of electrical pads. The body has at least two electrode-piezoelectric combination layers laminated together. The at least two electrode-piezoelectric combination layers are physically connected with but electrically isolated from each other. Each electrode-piezoelectric combination layer has at least two of the electrical pads thereon. The electrical pads extend out from the body of the corresponding PZT element, and all the electrical pads of each PZT element are offset a predetermined distance therebetween to be electrically isolated.

Preferably, each electrode-piezoelectric combination layer comprises at least a pair of electrode layers and a piezoelectric layer laminated between the pair of electrode layers, and all the electrode layers of each electrode-piezoelectric combination layer are separated from each other in the body. All the electrical pads are formed on the electrode layer and all the electrode layers have the electrical pads. The distance between the electrical pad of one of the electrode-piezoelectric combination layers and the corresponding electrical pad of the other electrode-piezoelectric combination layer of each PZT element is suitable for performing ball soldering or wire soldering. All electrode layers are not connected together correspondingly in the layered structure of the body directly as performed in the prior art, but are connected together via firstly making each electrical pad extending outwardly and secondly connecting the electrical pads of the electrode layers with the corresponding electrical pads of the suspension via common soldering machine in one step or multiple steps during the process of mounting the PZT elements onto the suspension, in which way the use of sputtering process is avoided and thereby manufacture cost is reduced.

A head gimbal assembly, comprises a slider, a PZT micro-actuator and a suspension to support the slider and the PZT micro-actuator. The suspension includes a flexure which has a tongue region and the tongue region comprises a slider mounting region for mounting the slider and a PZT mounting region for mounting the PZT micro-actuator. The PZT mounting region forms a plurality of electrical pads. The PZT micro-actuator comprises a pair of separate PZT elements and each PZT element has a body and a plurality of electrical pads. The body has at least two electrode-piezoelectric combination layers laminated together. The electrode-piezoelectric combination layers are physically connected with but electrically isolated from each other. Each electrode-piezoelectric combination layer has at least two of the electrical pads thereon. The electrical pads extend out from the body of the corresponding PZT element and all the electrical pads of each PZT element are offset a predetermined distance therebetween. The pair of PZT elements are mounted in the PZT mounting region. The electrical pads of different electrode-piezoelectric combination layers of each PZT element as well as the electrical pads of different electrode-piezoelectric combination layers of each PZT element and the PZT mounting region are bonded correspondingly via common soldering machine in one step or multiple steps such that electrical connections between different electrode-piezoelectric combination layers of the PZT element and between the PZT element and the suspension are established at the same time.

In an embodiment of the present invention, the electrical pads of the PZT mounting region comprises a first electrical connection pad, a second electrical connection pad and a common ground pad, one electrical pad of all the electrode-piezoelectric combination layers of one PZT element connects to the first electrical connection pad, the other electrical pad of all the electrode-piezoelectric combination layers of the one PZT element connects to the common ground pad; one electrical pad of all the electrode-piezoelectric combination layers of the other PZT element connects to the second electrical connection pad, the other electrical pad of all the electrode-piezoelectric combination layers of the other PZT element connects to the common ground pad. In this way the two PZT elements are in a serial connection fashion.

In another embodiment of the present invention, the electrical pads of the PZT mounting region comprises a first electrical connection pad and a second electrical connection pad, one electrical pad of all the electrode-piezoelectric combination layers of the two PZT elements connects to the first electrical connection pad, the other electrical pad of all the electrode-piezoelectric combination layers of the two PZT elements connects to the second electrical connection pad. In this way the two PZT elements are in a parallel connection fashion.

Preferably, the electrical connection between the electrical pads is established by metal ball bonding such as gold ball bonding, silver ball bonding or solder ball bonding.

The outer sides of two ends of the PZT mounting region of the suspension respectively extend toward the slider mounting region to form a strength beam, the slider mounting region overhangs between the two side strength beams. The flexure of the suspension forming two side strength beams thereon assists to improve shock performance of the suspension, thus avoiding problems such as suspension deformation and dimple separation and improving control ability over PSA (pitch static attitude) or RSA (roll static attitude) of the suspension, thereby improving the suspension static performance and dynamic performance.

Preferably, a flexible arm is connected between the strength beam and the slider mounting region, the flexible arm has a first end portion connected with an end of the strength beam adjacent to the slider mounting region and a second end portion connected with the slider mounting region, the slider mounting region overhangs between the two second end portions, the flexible arm forms a curved portion between the first end portion and the second end portion. The curved portion is formed by multiple flexible sections bending in different direction, and the adjacent flexible sections are connected by an arc structure. Alternatively, the curved portion is U-shaped, V-shaped, arc-shaped, or curve-shaped. The flexible arms assist to reduce reactive torque generated by the slider while flying.

An assembling method for a head gimbal assembly comprises steps of providing a slider; providing a PZT micro-actuator, wherein the micro-actuator comprises a pair of separate PZT elements and each PZT element has a body and a plurality of electrical pads, the body has at least two electrode-piezoelectric combination layers laminated together, the at least two electrode-piezoelectric combination layers are physically connected with but electrically isolated from each other, each electrode-piezoelectric combination layer has at least two of the electrical pads thereon, the electrical pads extend out from the body of the corresponding PZT element, and all the electrical pads of each PZT element are offset a predetermined distance therebetween; providing a suspension for mounting the slider and the PZT micro-actuator, wherein the suspension comprises a flexure which has a tongue region, the tongue has a slider mounting region for mounting the slider and a PZT mounting region for mounting the PZT micro-actuator, the PZT mounting region forms a plurality of electrical pads; mounting the two separate PZT elements of the PZT micro-actuator on the PZT mounting region of the suspension simultaneously and making the electrical pads of the PZT elements correspond to the electrical pads of the PZT mounting region, then bonding the corresponding electrical pads in one step or multiple steps via a soldering machine such that electrical connections between different electrode-piezoelectric combination layers of the PZT element and between the PZT element and the suspension are established at the same time; mounting the slider on the slider mounting region of the suspension and electrically connecting the slider with the suspension.

A disk drive unit comprises a head gimbal assembly, a drive arm connected to the head gimbal assembly, a disk and a spindle motor to spin the disk. The head gimbal assembly comprises a slider, a PZT micro-actuator and a suspension to support the slider and the PZT micro-actuator. The suspension includes a flexure which has a tongue region and the tongue region comprises a slider mounting region for mounting the slider and a PZT mounting region for mounting the PZT micro-actuator. The PZT mounting region forming a plurality of electrical pads. The PZT micro-actuator comprises a pair of separate PZT elements and each PZT element has a body and a plurality of electrical pads. The body has at least two electrode-piezoelectric combination layers laminated together. The electrode-piezoelectric combination layers are physically connected with but electrically isolated from each other. Each electrode-piezoelectric combination layer has at least two of the electrical pads thereon. The electrical pads extend out from the body of the corresponding PZT element and all the electrical pads of each PZT element are offset a predetermined distance therebetween. The pair of PZT elements are mounted in the PZT mounting region. The electrical pads of different electrode-piezoelectric combination layers of each PZT element as well as the electrical pads of different electrode-piezoelectric combination layers of each PZT element and the PZT mounting region are bonded correspondingly via common soldering machine in one step or multiple steps such that electrical connections between different electrode-piezoelectric combination layers of the PZT element and between the PZT element and the suspension are established at the same time In comparison with the prior art, the PZT micro-actuator of the present invention is formed by two separate PZT elements, thus the problem of weak structure which was caused by PZT micro-actuator formed by two-piece PZT elements mechanically connected with each other via thin material in the prior art does not exist. In addition, the damage of one PZT element does not affect the other PZT element, thus it is unnecessary to discard the damaged PZT element and the undamaged PZT element simultaneously, thereby reducing waste. As all electrode-piezoelectric combination layers of the PZT element have individual electrical pads and the electrical pads are isolated from each other, thus it is able to detect the defect of each PZT layer individually. Moreover, all the electrode-piezoelectric combination layers are electrically isolated from each other and unnecessary to establish electrical connection in the body. The corresponding electrode layers of the electrode-piezoelectric combination layers are connected by metal ball via common soldering machine in one step or multiple steps during the process of mounting the PZT elements onto the suspension, in which way the use of sputtering process is avoided and thereby manufacture cost is reduced.

Other aspects, features, and advantages of this invention will become apparent from the following detailed description when taken in conjunction with the accompanying drawings, which are a part of this disclosure and which illustrate by way of example, principles of this invention.

BRIEF DESCRIPTION OF THE DRAWINGS

The accompanying drawings facilitate an understanding of the various embodiments of this invention. In such drawings:

FIG. 8b is a view showing a layered structure of a PZT element of the PZT micro-actuator shown in FIG. 8a;

FIG. 8c is a circuit diagram of the PZT micro-actuator shown in FIG. 8a;

FIG. 8d is an alternative circuit diagram of the PZT micro-actuator shown in FIG. 8a;

FIG. 9b is an assembled, perspective view of the suspension shown in FIG. 9a;

FIG. 11b is a partially enlarged perspective view of the head gimbal assembly shown in FIG. 11a;

FIG. 11c is a partial side view of the head gimbal assembly shown in FIG. 11a;

DETAILED DESCRIPTION OF ILLUSTRATED EMBODIMENTS

Figure 8A:
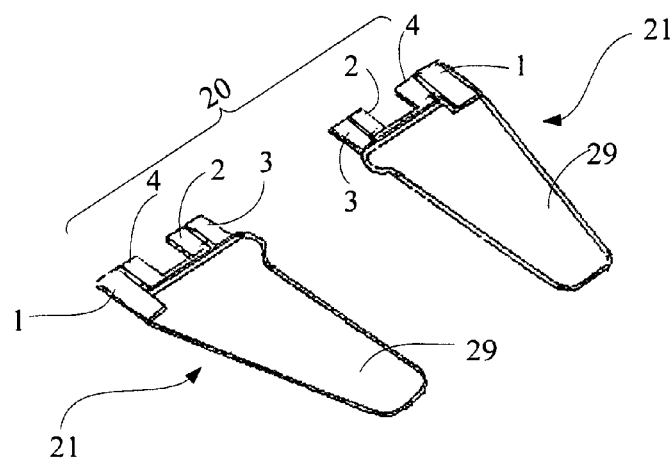
FIG. 8a illustrates a PZT micro-actuator for a head gimbal assembly according to an embodiment of the present invention.
Figure 8C:
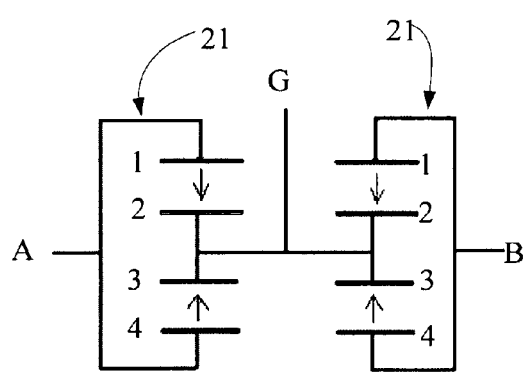

Various preferred embodiments of the invention will now be described with reference to the figures, wherein like reference numerals designate similar parts throughout the various views. An embodiment of a PZT micro-actuator for a head gimbal assembly is first illustrated. FIGS. 8a-8d illustrate the embodiment of a PZT micro-actuator according to the present invention. As shown in FIG. 8a, compared with conventional PZT micro-actuator formed by two piece PZT elements connected together, the present invention provides a PZT micro-actuator 20 formed by two piece PZT elements 21 separate from each other.

Figure 8B:
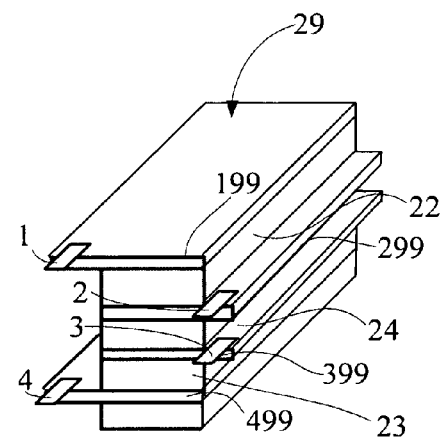
Figure 8D:
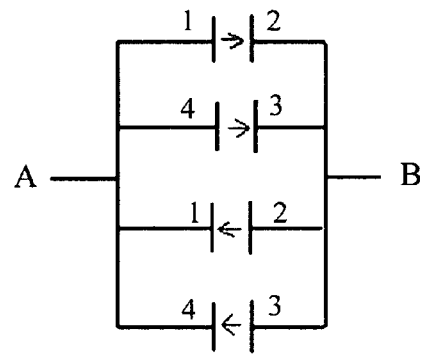

Each PZT element 21 has a sheet-shaped body 29 and a plurality of, such as four electrical pads 1, 2, 3 and 4 formed on the sheet-shaped body 29. FIG. 8b illustrates the detailed structure of the PZT element 21. As shown in FIG. 8b, the body 29 comprises multiple PZT layers such as the first PZT layer 22 and the second PZT layer 23 laminated together. In addition, each PZT layer has electrode layers laminated on the two opposite surfaces thereof. For example, as shown in FIG. 8b, a first electrode layer 199 and a second electrode layer 299 are respectively laminated on the upper surface and lower surface of the first PZT layer 22 and the first electrode layer 199 and the second electrode layer 299 are separated from each other in the body 29. A first electrode layer 399 and a second electrode layer 499 are respectively laminated on the upper surface and lower surface of the second PZT layer 23 and the first electrode layer 399 and the second electrode layer 499 are also separated from each other in the body 29. The first PZT layer 22 and the pair of electrode layers 199, 299 laminated on the surfaces of the first PZT layer 22 form a first electrode-piezoelectric combination layer. Similarly, the second PZT layer 23 and the pair of electrode layers 399, 499 laminated on the surfaces of the second PZT layer 23 form a second electrode-piezoelectric combination layer. In addition, the two electrode-piezoelectric combination layers are physically connected with but electrically isolated from each other by an isolated layer 24 positioned between the electrode layers 299, 399. The isolated layer 24 could be formed from suitable insulation material such as epoxy resin thus to electrically isolate the two combination layers.

Referring to FIGS. 8a, 8b, each electrode-piezoelectric combination layer forms two electrical pads. The first electrode-piezoelectric combination layer forms electrical pads 1, 2 and the second electrode-piezoelectric combination layer forms electrical pads 3, 4. More specifically, the electrical pad 1 is formed on the first electrode layer 199 of the first PZT layer 22, and the electrical pad 2 is formed on the second electrode layer 299 of the first PZT layer 22. Similarly, the electrical pad 3 is formed on the first electrode layer 399 of the second PZT layer 23, and the electrical pad 4 is formed on the second electrode layer 499 of the second PZT layer 23. In addition, these electrical pads 1, 2, 3, 4 all extend out from the corresponding electrode layers and are offset a predetermined distance therebetween to be electrically isolate from each other. Preferably, in order to achieve electrical connection between the PZT micro-actuator 20 and the other component such as suspension shown in FIG. 9b easily, the electrical pad 1 of the first electrode layer 199 of the first PZT layer 22 could be formed closed to the pad 4 of the second electrode layer 499 of the second PZT layer 23, but the electrical pads 1, 4 should be still offset a suitable distance such as 10~200 um so as to simultaneously bond the two electrical pads 1, 4 with the corresponding electrical pads on the suspension via metal ball bonding such as golden ball boding or silver ball bonding or solder ball bonding. Correspondingly, the electrical pad 2 of the second electrode layer 299 of the first PZT layer 22 could be formed closed to the pad 3 of the first electrode layer 399 of the second PZT layer 23 and should be still offset a suitable distance such as 10~200 um so as to simultaneously bond the two electrical pads 2, 3 with the corresponding electrical pads on the suspension via metal ball bonding. Therefore, metal ball bonding in one step could establish electrical connections between all electrode-piezoelectric combination layers of the PZT element 21 and between the PZT element 21 and the suspension at the same time.

Figure 9A:
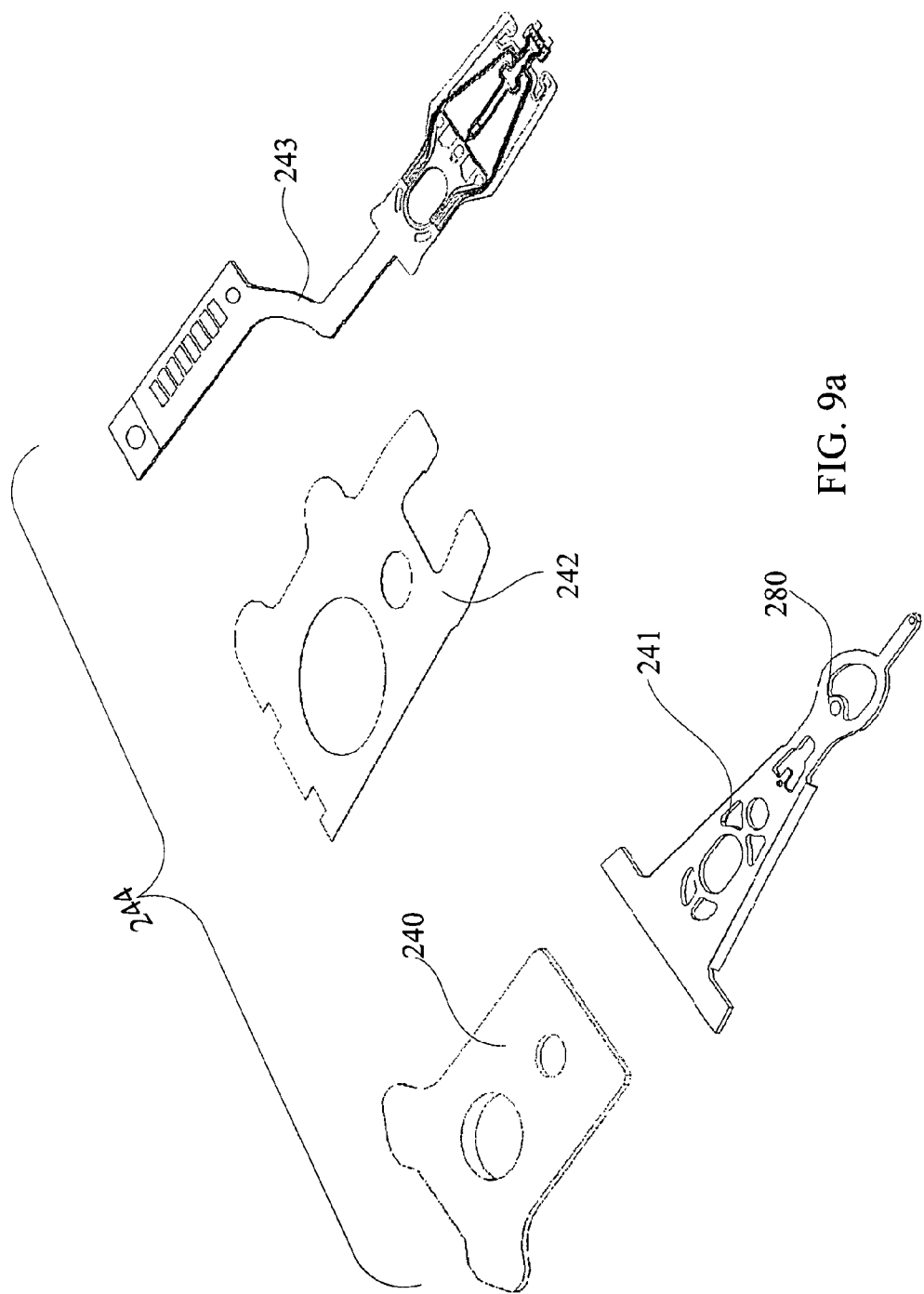
FIG. 9a is an exploded, perspective view of a suspension according to an embodiment of the present invention for mounting the PZT micro-actuator of FIG. 8a thereon.
Figure 9B:
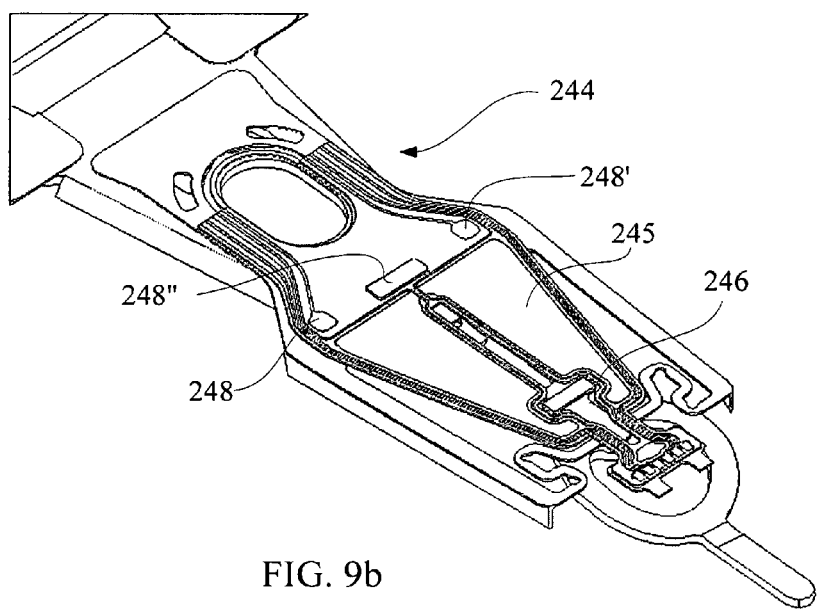

After the PZT micro-actuator 20 mentioned-above is mounted on the suspension shown in FIG. 9b and electrically connected with the suspension, the two PZT elements 21 could form various electrical connection relations therebetween. For example, in the embodiment shown in FIG. 8c, the two PZT elements 21 form a serial connection relation therebetween. That is, the two PZT elements 21 are serially connected between the end point A and the end point B, wherein electrical pads 1, 4 of one PZT element 21 are connected at the end point A and the electrical pads 1, 4 of the other PZT element 21 are connected at the end point B, while the electrical pads 2, 3 of the two PZT elements are connected to a ground end point G. The first PZT layer 22 and the second PZT layer 23 have opposite polarization direction to each other. In the embodiment shown in FIG. 8d, four PZT layers of the two PZT elements 21 are parallelly connected between the end point A and the end point B. That is, electrical pads 1, 4 of the two PZT elements 21 are connected at the end point A and the electrical pads 2, 3 of the two PZT elements 21 are connected at the end point B. The first PZT layer 22 and the second PZT layer 23 of each PZT element have opposite polarization direction to each other. Such connection relation ensures a maximal rotation displacement of the PZT micro-actuator.

The PZT micro-actuator of the present invention applies two separate PZT elements, thus the problem of weak structure which was caused by PZT micro-actuator formed by two-piece PZT elements mechanically connected with each other via thin material in the prior art does not exist. In addition, the damage of one PZT element does not affect the other PZT element, thus it is unnecessary to discard the damaged PZT element and the undamaged PZT element simultaneously, thereby reducing waste. As all electrode-piezoelectric combination layers of the PZT element have individual electrical pads, thus it is able to detect the defect of each PZT layer individually. Moreover, all electrode layers of the PZT element are not connected together correspondingly in the layered structure of the body directly as performed in the prior art, but are connected together by metal balls via common soldering machine in one step or multiple steps during the process of mounting the PZT elements onto the suspension, in which way the use of sputtering process is avoided and thereby manufacture cost is reduced.

FIGS. 9a-e illustrate the structure of the suspension and an assembling method for PZT micro-actuator 20 and the suspension. As shown, a suspension 244 comprises a base plate 240 and a load beam 241, and the base plate 240 and the load beam 241 are connected with each other via a hinge 242. The base plate 240 and the load beam 241 could be formed from enough stiffness material such as stainless steel in order to provide enough stiff for the suspension 244. In addition, the load beam 241 supports a flexure 243 having suitable elasticity. The flexure 243 has a tongue region at an end thereof. The tongue region comprises a PZT mounting region 245 for mounting PZT micro-actuator 20 and a slider mounting region 246 for mounting a slider. The PZT mounting region 245 forms a set of electrical pads. The set of electrical pads comprises a first electrical connection pad 248, a second electrical connection pad 248' and a common ground pad 248". In addition, a set of inner suspension traces 255 extend on the flexure 243 and toward the PZT mounting region 245. The ends of the two inner suspension trances 255 are respectively connected with the first electrical connection pad 248 and the second electrical connection pads 248'. The set of electrical pads 248, 248', and 248" are used to electrically connect with corresponding electrical pads of the PZT micro-actuator 20. Similarly, a set of outer suspension traces 254 also extend on the flexure 243 and toward the slider mounting region 246. The ends of the outer suspension traces 254 form a set of electrical pads 250 used to electrically connect with the slider. The load beam 241 forms a dimple 280 thereon, and the dimple 280 is formed below the center of the slider mounting region 246 of the flexure 243 for providing enough bias force for slider via load beam 241. An air suspending force generated upon the slider by the disk drive unit during operation could be equaled by the bias force, thereby keeping the slider a suitable flying height.

Figure 9C:
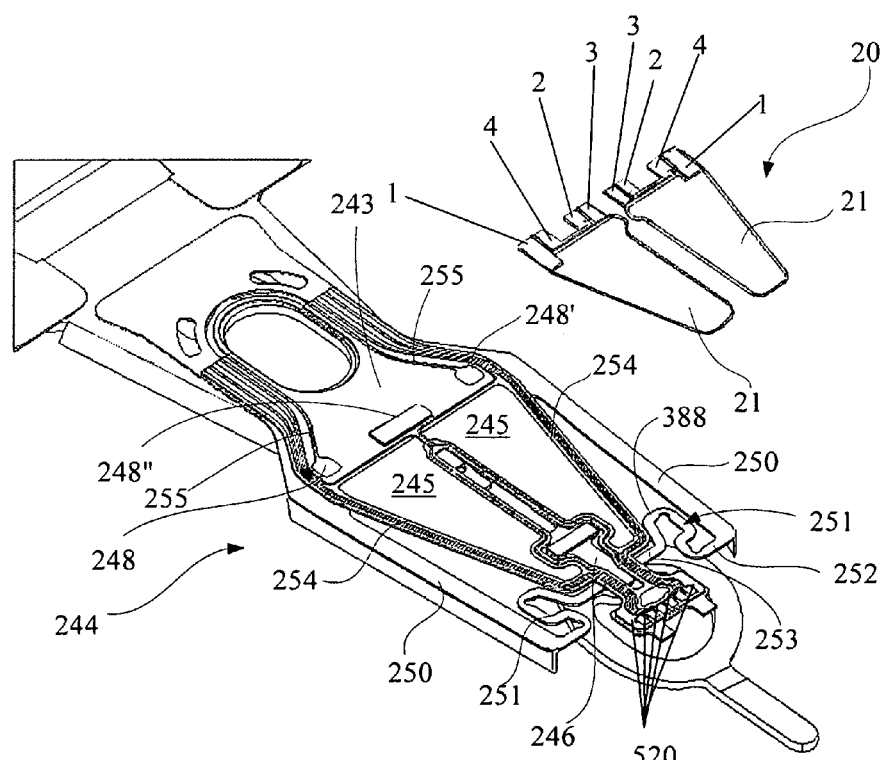
FIG. 9c illustrates the process of mounting the PZT micro-actuator of the present invention onto the suspension shown in FIG. 9b.
Figure 9E:
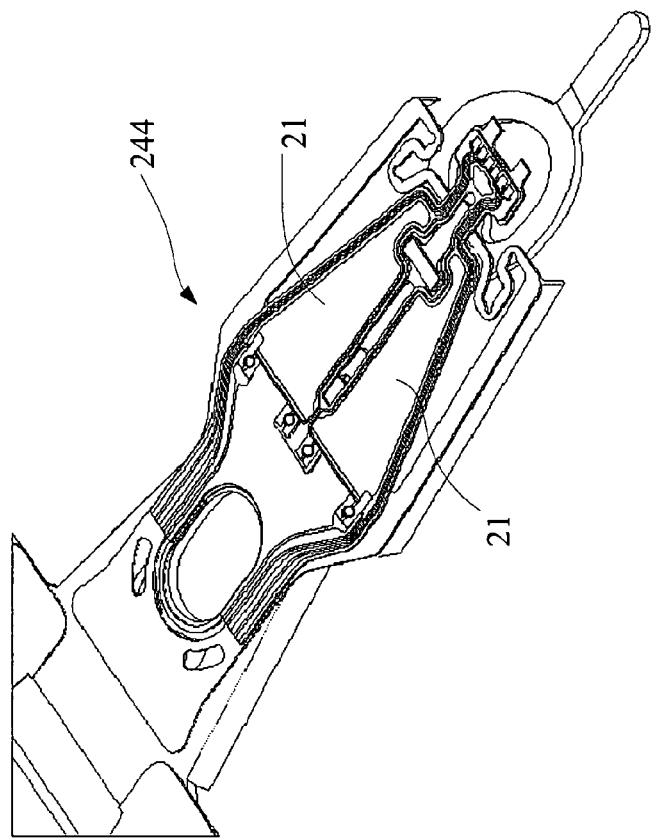
FIGS. 9d-9e illustrate electrical connection process of the PZT micro-actuator and the suspension shown in FIG. 9c.
Figure 9D:
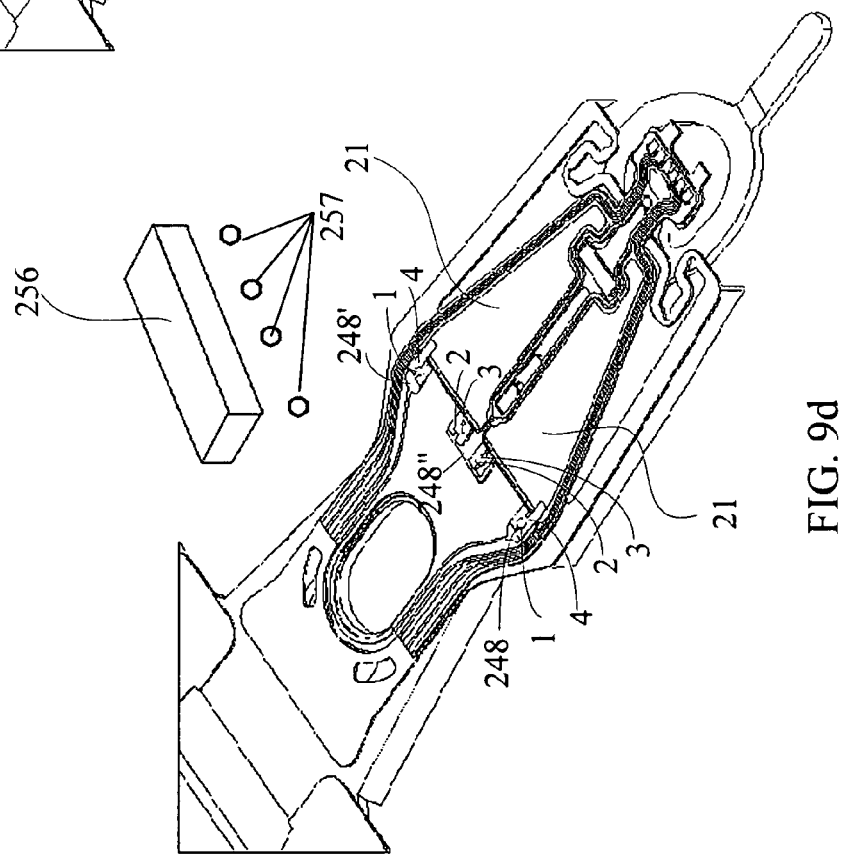

FIGS. 9c-9d illustrate process and method for mounting the PZT micro-actuator 20 on the suspension 244. First, the pair of PZT elements 21 of the PZT micro-actuator 20 are bonded to the pair of PZT mounting region 245 of the suspension 244 simultaneously and the electrical pads 1, 2, 3, 4 of the PZT micro-actuator 20 are positioned on the electrical pads 248, 248', 248" of the suspension 244 according to the electrical connection relation mentioned above. More specifically, in the process of establishing serial connection relation, the electrical pads 1, 4 of one PZT element 21 are positioned on the first electrical pad 248 and the electrical pad 2, 3 of the one PZT element 21 are positioned on the common ground pad 248". The electrical pads 1, 4 of the other PZT element 21 are position on the second electrical connection pad 248', and the electrical pad 2, 3 of the other PZT element 21 are positioned on the common ground pad 248". Then, suitable solder 257 such as solder ball or gold ball is bonded to corresponding electrical pads in one step or multiple steps via the soldering machine 256 such that electrical connections between different electrode-piezoelectric combination layers of the PZT element 21 and between the suspension 244 and the PZT element 21 are achieved at the same time. In the process of establishing parallel connection relation, the electrical pads 1, 4 of the two PZT elements 21 are positioned on the first electrical connection pad 248 and the electrical pads 2, 3 of the two PZT elements 21 are positioned on the second electrical connection pad 248'. Similarly, suitable solder 257 such as solder ball or gold ball is bonded to corresponding electrical pads in one step or multiple steps via the soldering machine 256 such that electrical connections between different electrode-piezoelectric combination layers of the PZT element 21 and between the suspension 244 and the PZT element 21 are achieved at the same time. After that, the slider 203 is mounted on the slider mounting region 246 of the suspension 244 and the slider 203 is electrically connected to the suspension 244.

In addition, in order to solve the poor shock performance in the prior art, the present invention provides an improved suspension. As shown in FIG. 9c, the outer sides of the two ends of the PZT mounting region 245 of the flexure 243 of the suspension 244 respectively extend toward the slider mounting region 246 to form two side strength beams 250. Two side flexible arms 251 are respectively formed between the strength beam 250 and the slider mounting region 246. The two side flexible arms 251 are made from material which is easy to deform elastically. Each flexible arm 251 has a first end portion 252 and a second end portion 253. The first end portion 252 is connected with an end of the strength beam 250 adjacent to the slider mounting region 246. The second end portion 253 is connected with the slider mounting region 246. The slider mounting region 246 overhangs between the two second end portions 253. A curved portion 388 is formed between the first end portion 252 and the second end portion 253 of each flexible arm 251. The curved portion 388 is formed by multiple flexible sections bending in different direction, and the adjacent flexible sections are connected by an arc structure.

Figure 1:
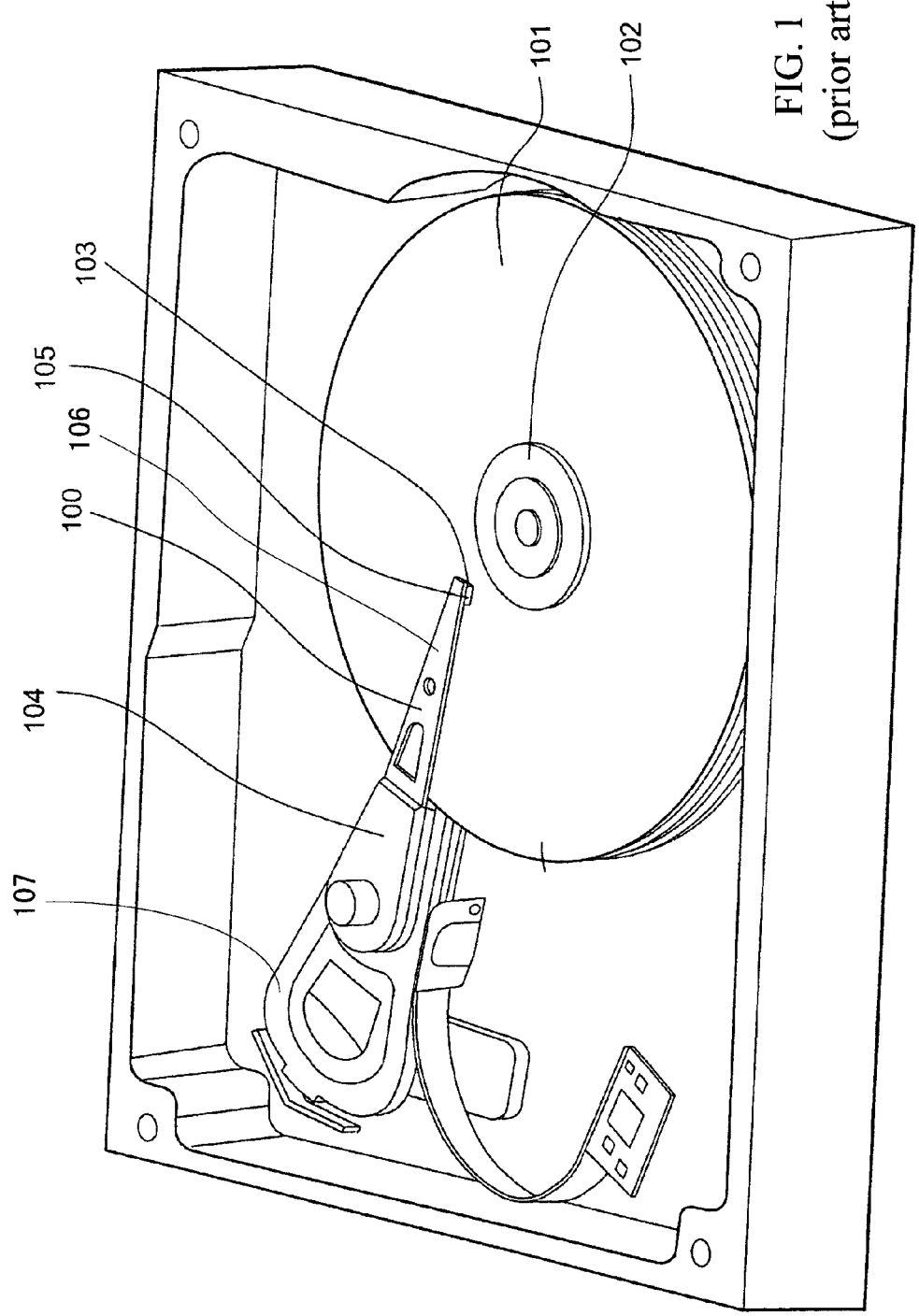
FIG. 1 is a perspective view of a conventional disk drive unit.
Figure 2:
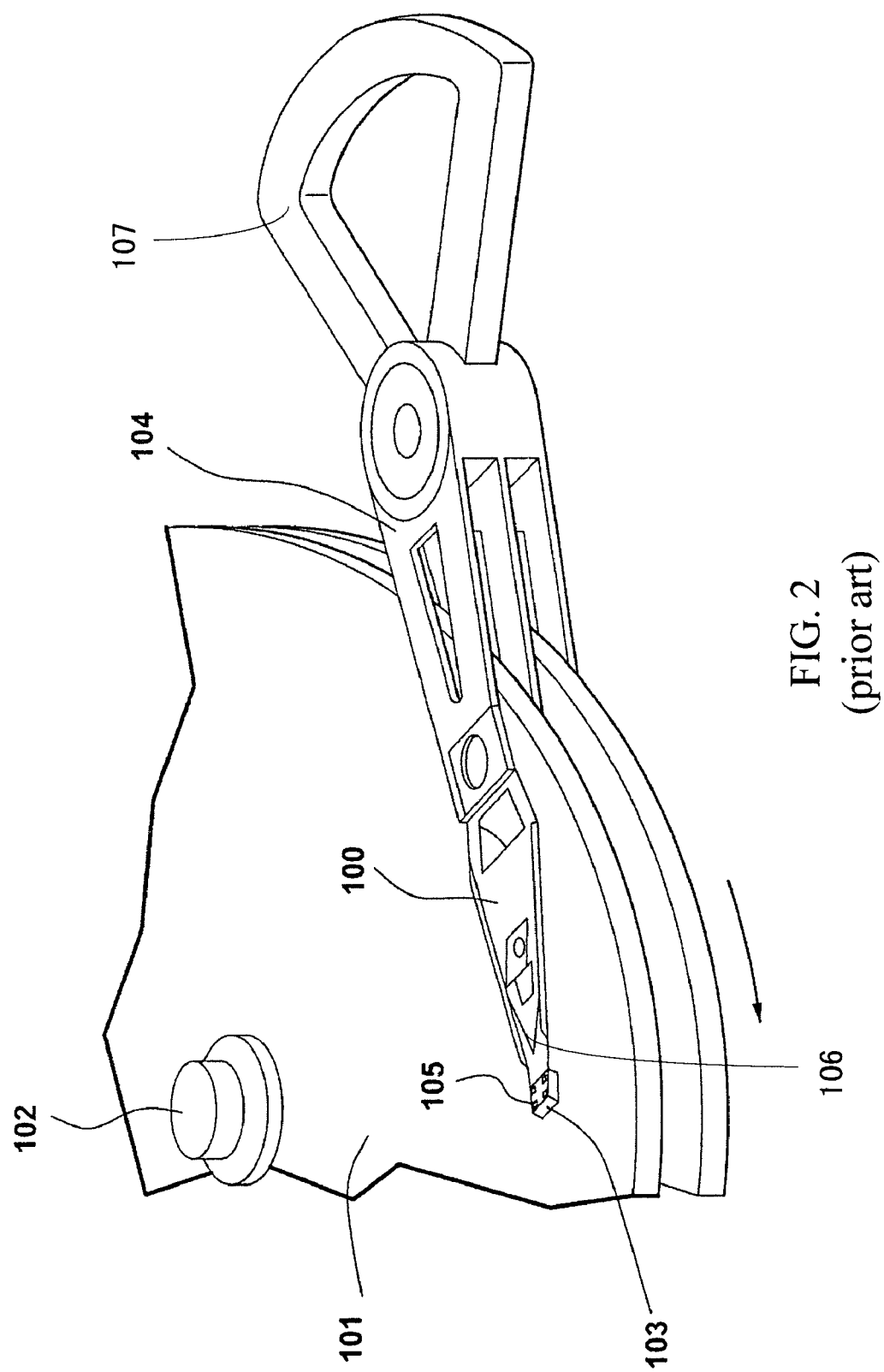
FIG. 2 is a partially enlarged view of the disk drive unit shown in FIG. 1.
Figure 3:
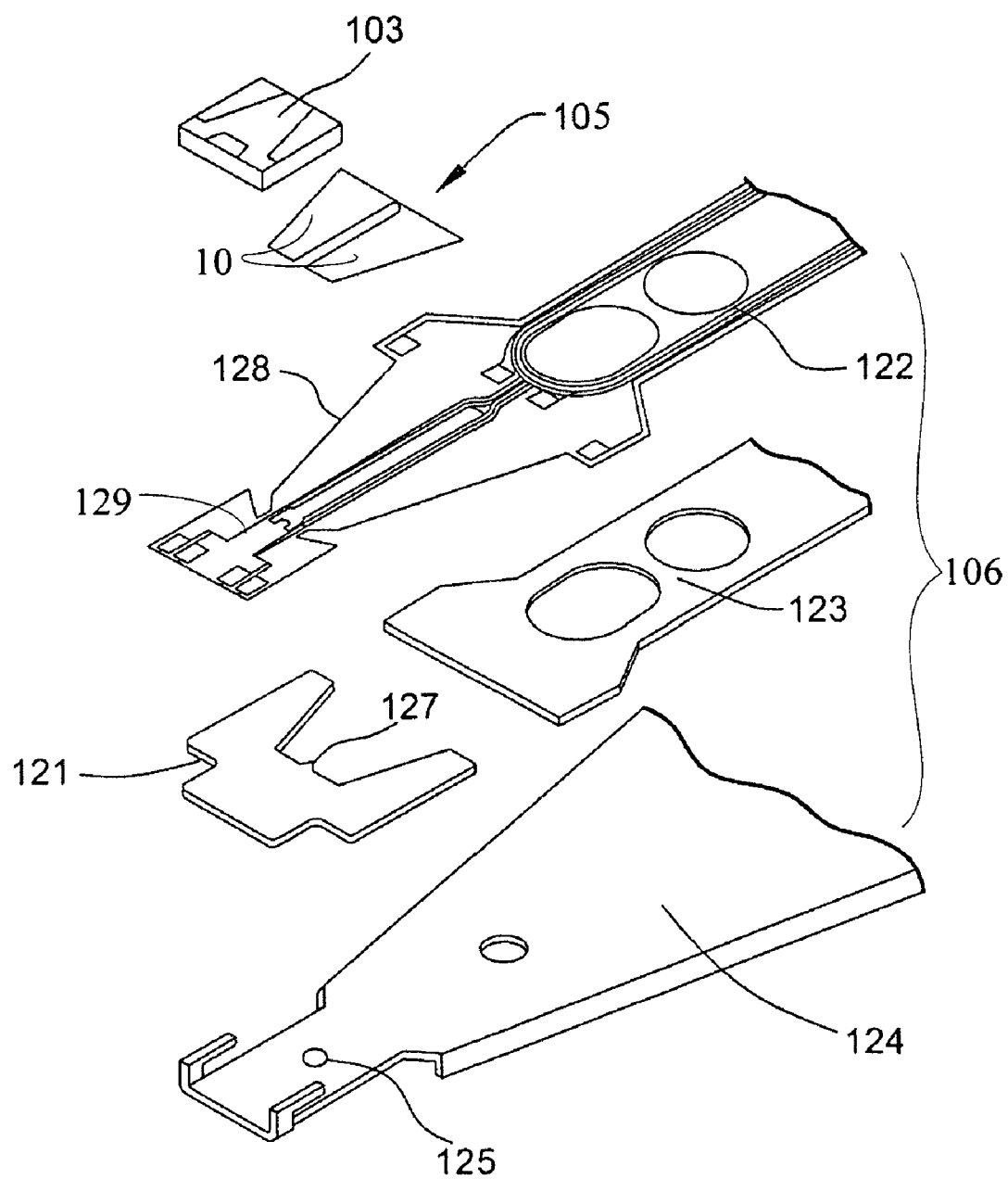
FIG. 3 is an exploded, perspective view of a head gimbal assembly of the disk drive unit shown in FIG. 1.
Figure 4:
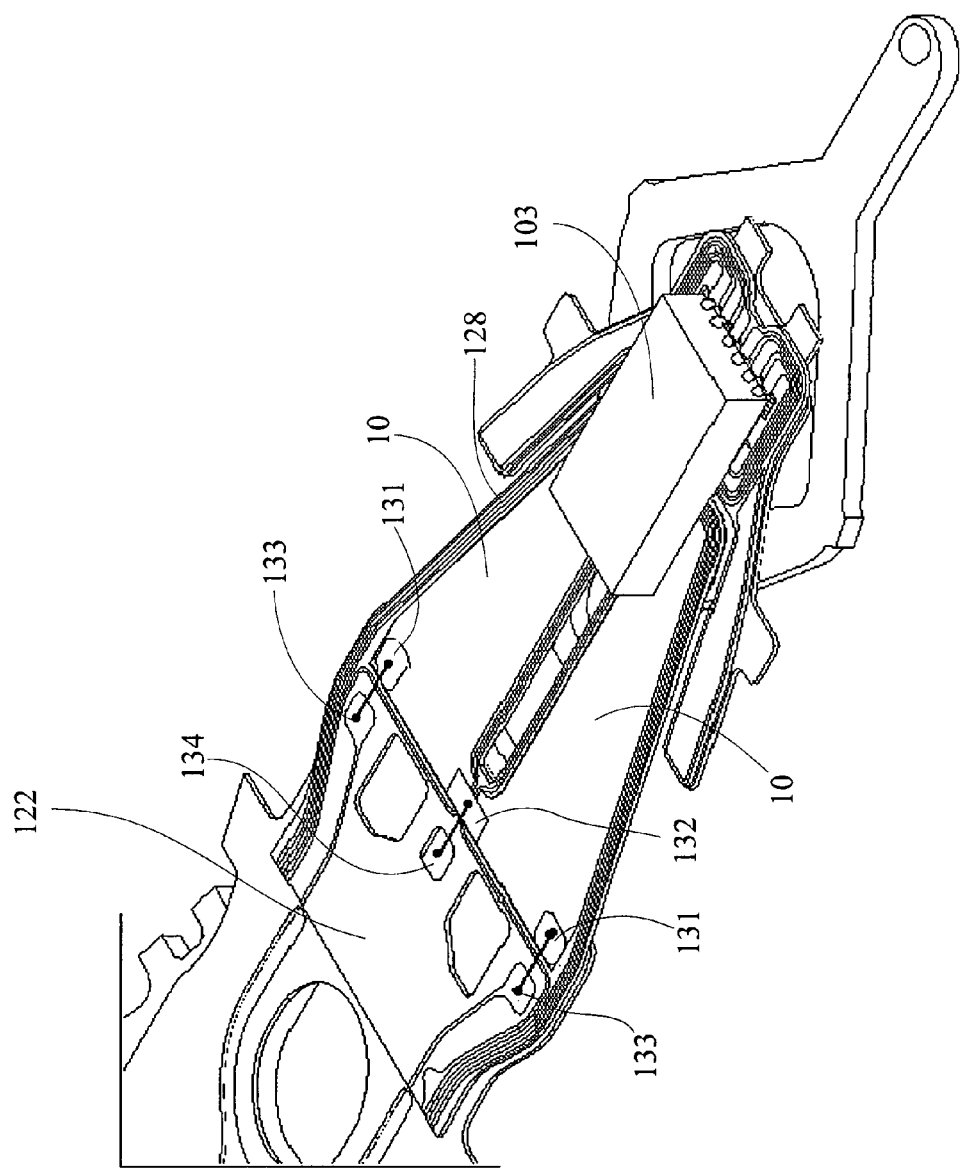
FIG. 4 is a partial perspective view of the head gimbal assembly shown in FIG. 3 after assembled.
Figure 5:
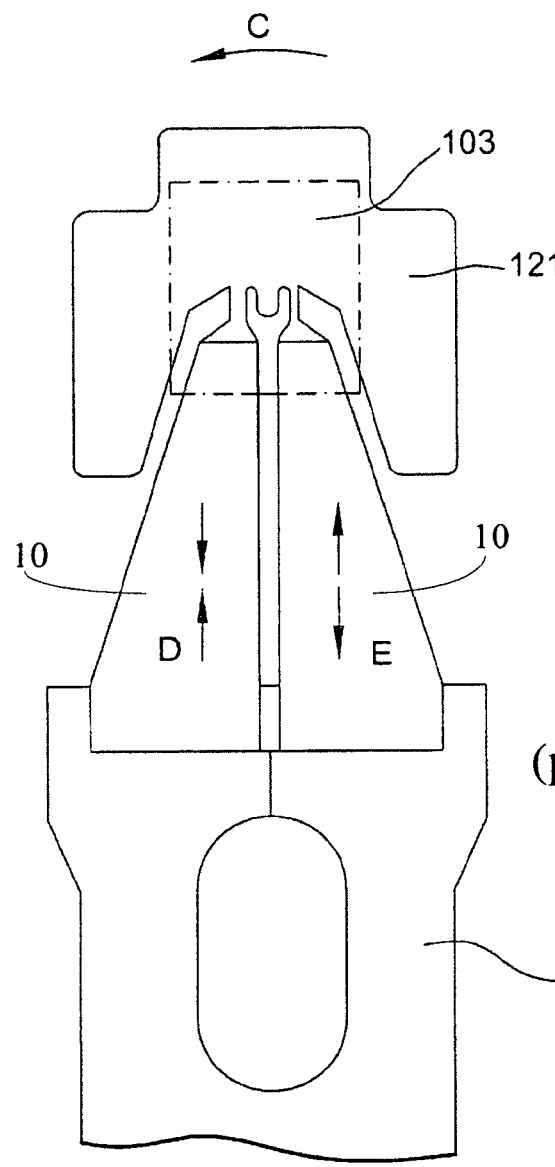
FIG. 5 is a partial plane view of the head gimbal assembly shown in FIG. 3, illustrating the operation principle of a PZT micro-actuator.
Figure 5A:
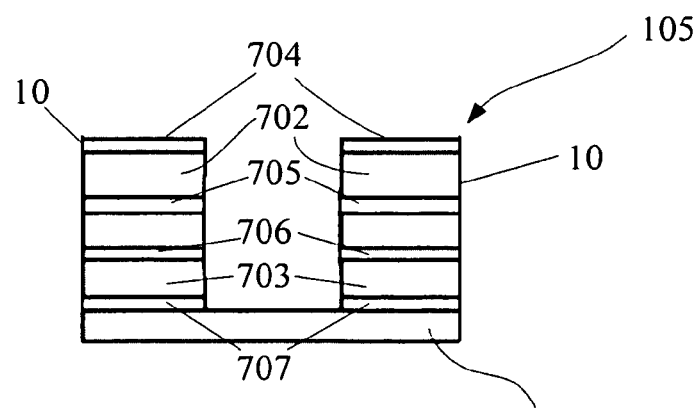
FIG. 5a is a structural diagram of a prior PZT micro-actuator.
Figure 6:
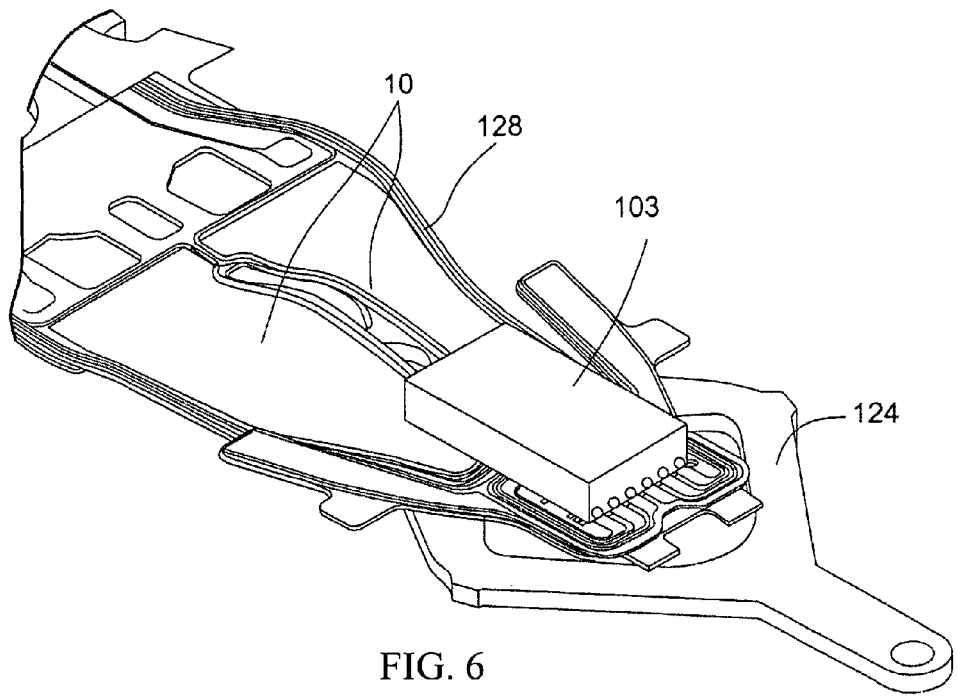
FIG. 6 is a diagrammatic view illustrating a suspension tongue region deformation problem of the conventional head gimbal assembly.
Figure 7:
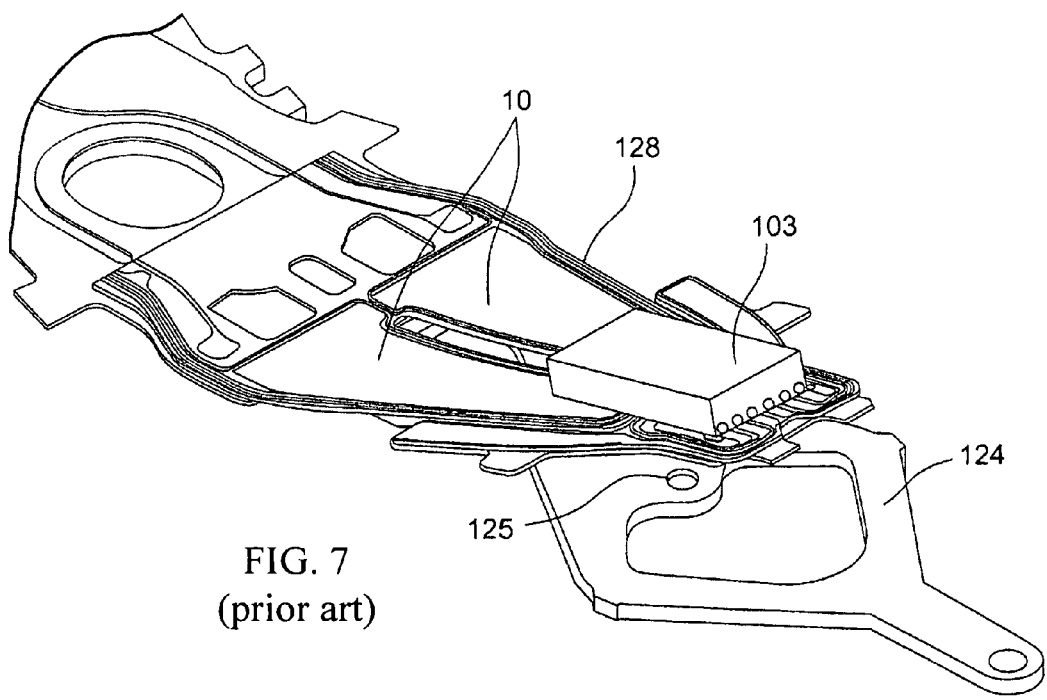
FIG. 7 is a diagrammatic view illustrating a dimple separation problem of the conventional head gimbal assembly.

As shown in the figures, the slider mounting region 246 indirectly overhangs between the strength beams 250. The overhanging structure improves shock performance of the suspension. More specifically, the overhanging structure improves shock performance of the slider mounting region 246. This is because that when the vibration happens, the strength beams 250 having enough stiffness could resist vibration themselves, vibration deformation of the strength beams 250 and the slider mounting region 246 indirectly overhanging between the strength beams 250 are avoided. In addition, because the slider mounting region 246 directly overhangs between the flexible arms 251 and the flexible arm 251 has a curved portion 388 formed by multiple bending flexible sections, it is easy to achieve free rotation for the slider when the PZT elements 21 are driven. In the HGA 400 shown in FIG. 4a, the slider 203 is partially mounted over the PZT elements 21 and on the slider mounting region 246, hence it is much easier to achieve free rotation for the slider when the PZT elements are driven because of the existence of the flexible arms 251.

Figure 10:
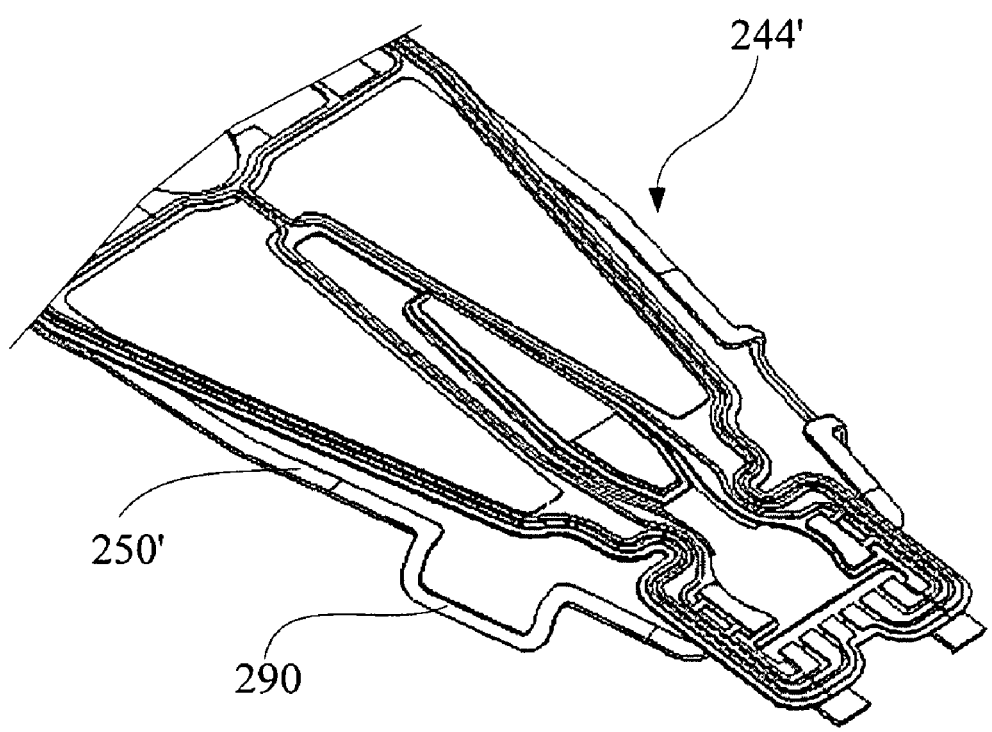
FIG. 10 is a partially enlarged perspective view of a suspension according to another embodiment of the present invention.

FIG. 10 illustrates another structure of a suspension according to the present invention in order to improve suspension shock performance. In FIG. 10, the strength beam 250' of the suspension 244' forms suitable curved portion 290, such as U-shaped, V-shaped, arc-shaped or curve-shape portion. The difference between the curved portion 290 and the curved portion 288 of the embodiment above-mentioned is that all bending flexible section bend in the plane of the flexure 243, referred to as side bend forming. The bending section of the curved portion 290 bend in a direction vertically to plane of the flexure, referring to as vertical bend forming, which also assists to improve shock performance of the suspension.

The strength beams 250, 250' of the suspension enable to improve the shock performance of the suspension, thereby assisting the HGA with the suspension to successfully avoid problems of suspension deformation and dimple separation. In addition, the suspension having strength beam 250, 250' enables the HGA to possess sound static performance, such as control ability over PSA (pitch static attitude) or RSA (roll static attitude), which accordingly, improves dynamic performance of the HGA during process of slider flying over the disk.

Figure 11A:
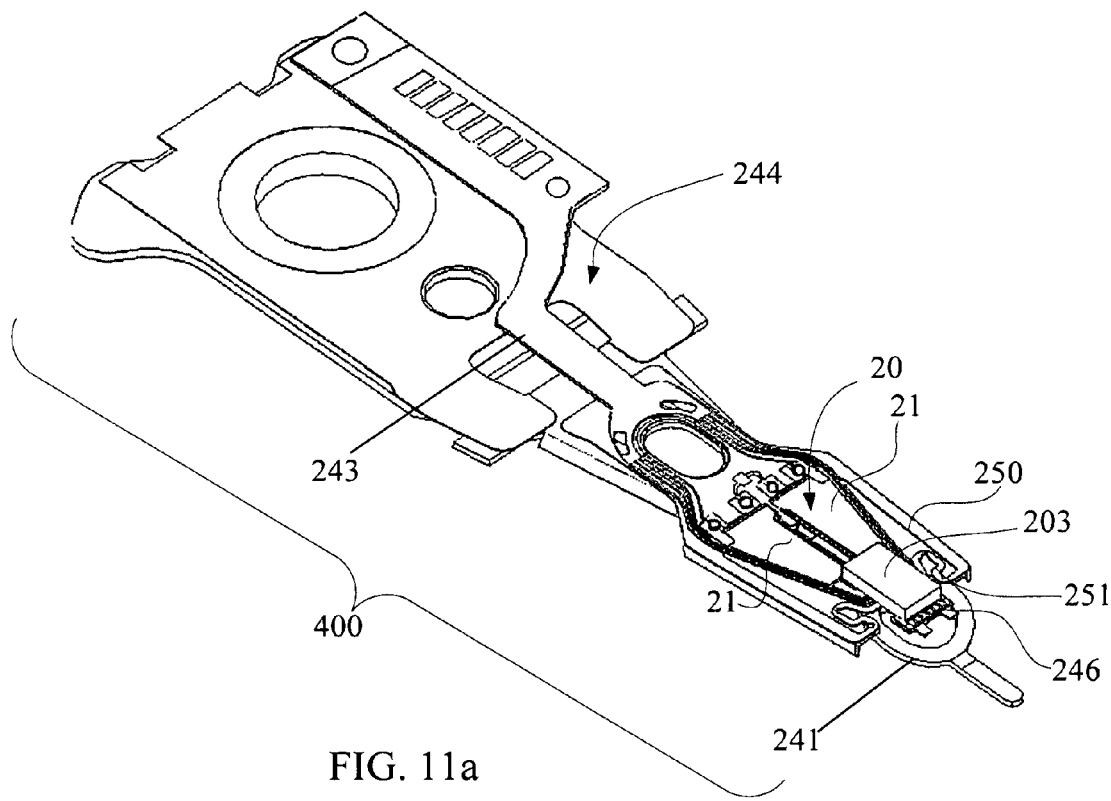
FIG. 11a is a perspective view of a head gimbal assembly having a PZT micro-actuator of the present invention.
Figure 11B:
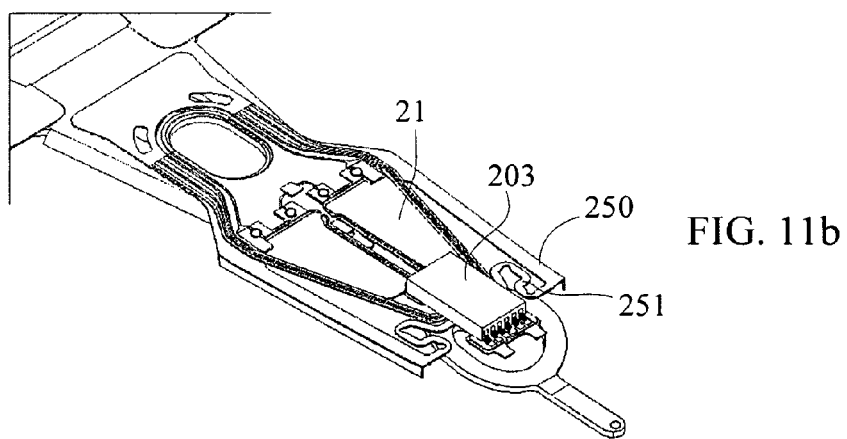
Figure 11C:
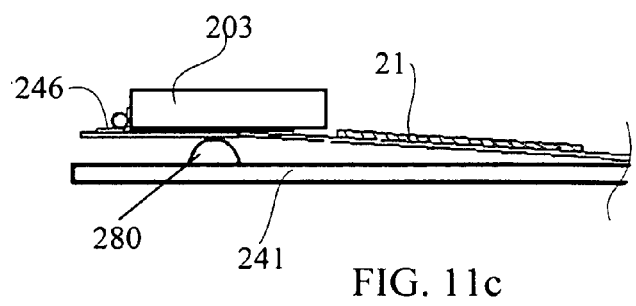

FIGS. 11a-11c illustrate a head gimbal assembly of the present invention. The slider 203 is mounted on the suspension 244, 244' having the PZT micro-actuator 20 of the present invention and the HGA 400 is attained. As shown in these figures, the pair of PZT elements 21 of the PZT micro-actuator 20 are mounted on the PZT mounting region of the flexure 243 while the slider 203 is mounted on the slider mounting region 246 of the flexure 243 and partially positioned over the pair of PZT elements 21. The slider 203 overhangs between the pair of the strength beams 250 via flexible arms 251. The dimple 280 of the load beam 241 supports the center of the slider 203. As mentioned above, the existence of the strength beams 250, 250' improves the shock performance of the HGA 400, while the existence of the curved portion 388, 390 improves the rotation characteristics of the slider 203.

Figure 12A:
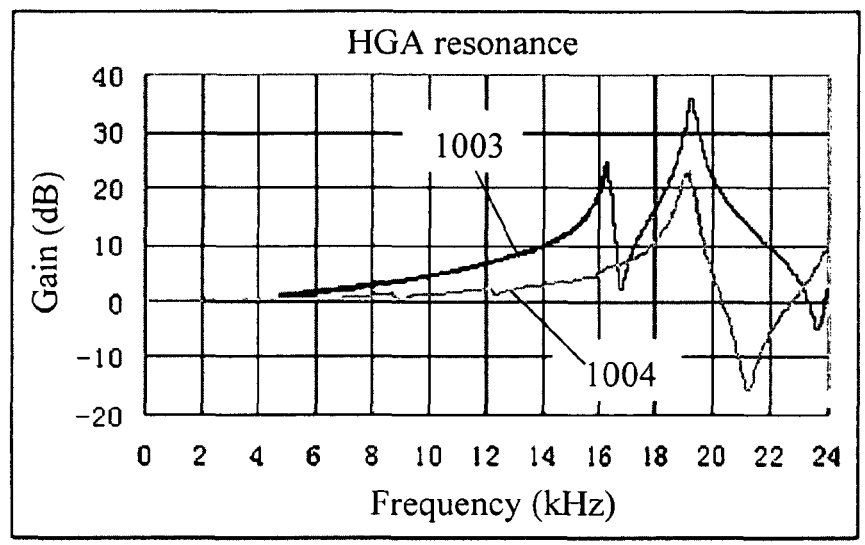
FIG. 12a is a shock performance diagram of the head gimbal assembly of the present invention.

FIG. 12a is a diagram showing resonance performance of the HGA 400 of the present invention. As shown in FIG. 12a, the curve 1003 represents vibration characteristics of the base plate of the suspension while the curve 1004 represents vibration characteristics of the PZT elements. Known from FIG. 12a, the resonance frequency of the base plate is 16 KHZ and the resonance frequency of the PZT elements is 19 KHZ. When the PZT elements are in operation, the resonance of the base plate is not excited, which greatly improves servo characteristic of the disk drive unit.

Figure 12B:
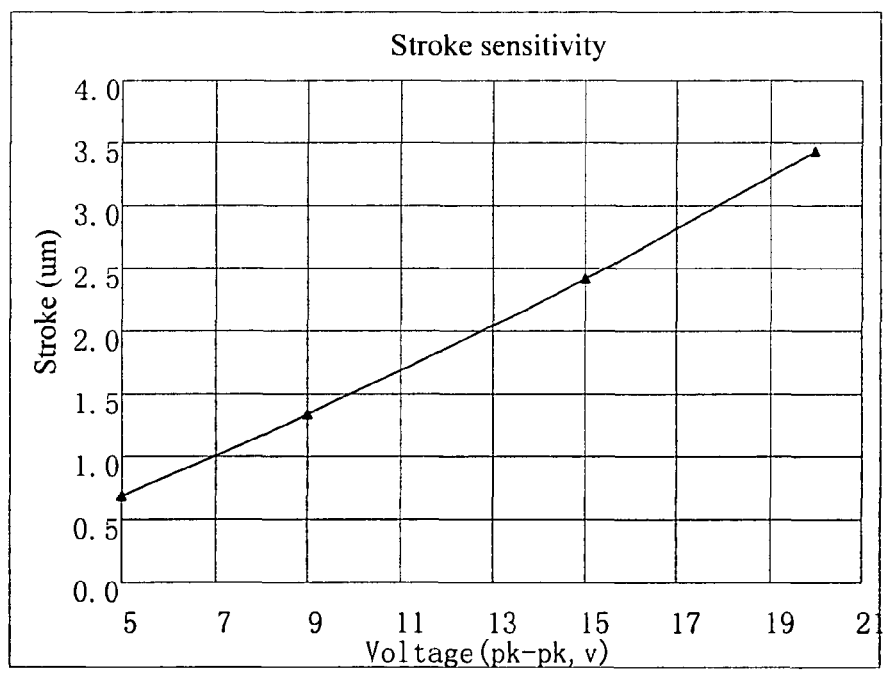
FIG. 12b is a stroke sensitivity testing data diagram of the head gimbal assembly of the present invention.

FIG. 12b is a testing data diagram of the stroke sensitivity of the HGA of the present invention. As shown in FIG. 12b, the abscissa represents voltage applied to the PZT elements and the ordinate represents displacement of the slider resulted by the voltage applied. The ordinate-to-abscissa ratio, that is, the slope of the line shown could reflect stroke sensitivity. By calculation, it is known that the stroke sensitivity is about 170 nm/v.

Figure 13:
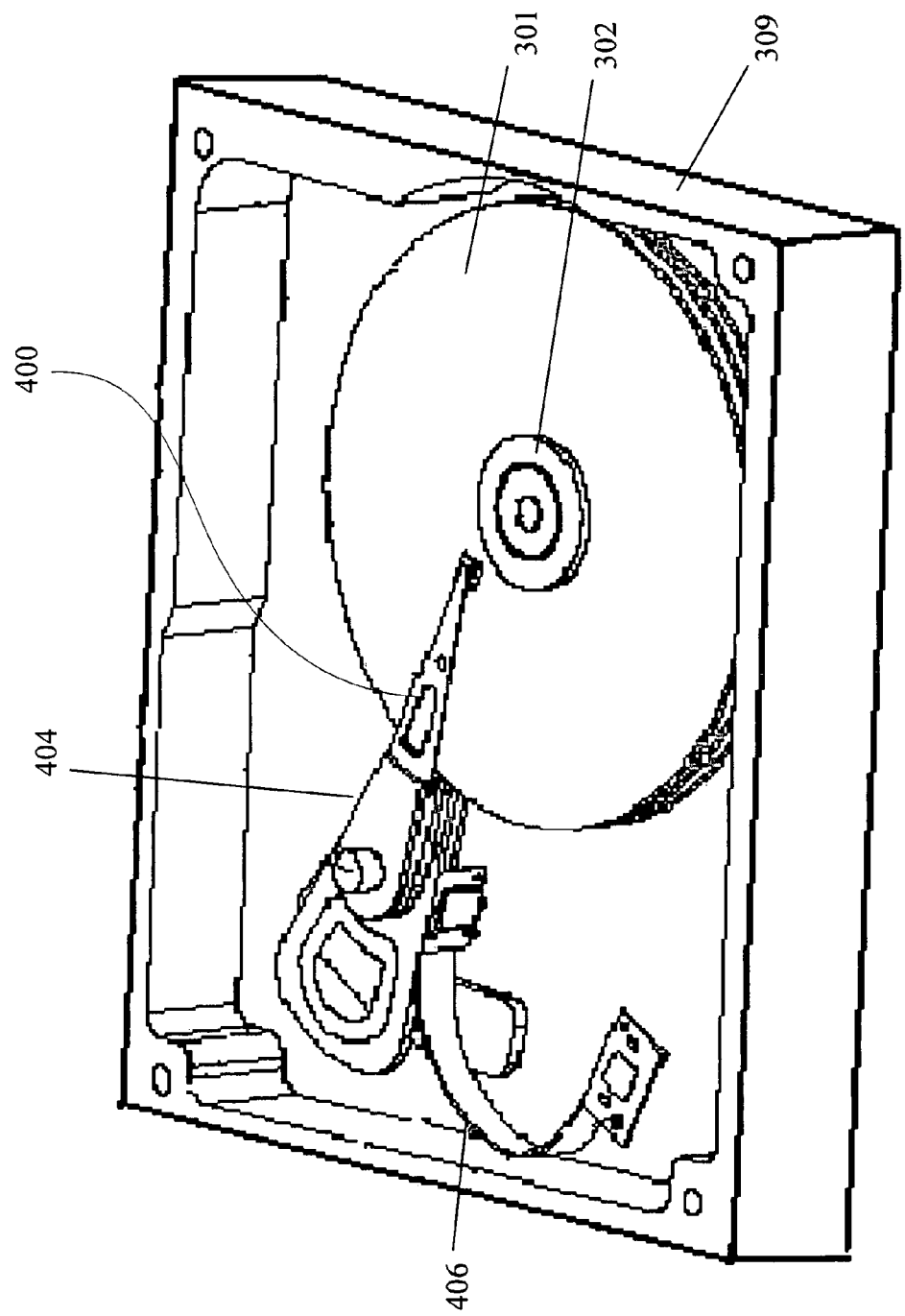
FIG. 13 is a perspective view of a disk drive unit according to the present invention.

FIG. 13 illustrates a disk drive unit according to an embodiment of the present invention. As shown in FIG. 13, the disk drive unit can be attained by assembling a cover 309, a disk 301, a spindle motor 302 to spin the disk 301, a voice coil motor 406 and a drive arm 404 with the HGA 400. Because the structure and/or assembly process of disk drive unit of the present invention are well known to persons ordinarily skilled in the art, a detailed description of such structure and assembly is omitted herefrom.

The foregoing description of the present invention has been presented for purposes of illustration and description. It is not intended to be exhaustive or limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:
1. A head gimbal assembly, comprising:
a slider;
a PZT micro-actuator; and
a suspension to support the slider and the PZT micro-actuator, the suspension including a flexure which has a tongue region, the tongue region comprising a slider mounting region for mounting the slider and a PZT mounting region for mounting the PZT micro-actuator, the PZT mounting region forming a plurality of electrical pads;
wherein the PZT micro-actuator comprises:
a pair of separate PZT elements, each PZT element having a body and a plurality of electrical pads;
wherein the body has at least two electrode-piezoelectric combination layers laminated together, the electrode-piezoelectric combination layers are physically connected with but electrically isolated from each other, each electrode-piezoelectric combination layer has at least two of the electrical pads thereon, the electrical pads extend out from the body of the corresponding PZT element, and all the electrical pads of each PZT element are offset a predetermined distance therebetween;

wherein the pair of PZT elements are mounted in the PZT mounting region, the electrical pads of different electrode-piezoelectric combination layers of each PZT element as well as the electrical pads of different electrode-piezoelectric combination layers of each PZT element and the PZT mounting region are bonded correspondingly via a common soldering machine in one step or multiple steps such that electrical connections between different electrode-piezoelectric combination layers of the PZT element and between the PZT element and the suspension are established at the same time.

2. The head gimbal assembly according to claim 1, wherein each electrode-piezoelectric combination layer comprises at least a pair of electrode layers and a piezoelectric layer laminated between the pair of electrode layers, all the electrode layers of each electrode-piezoelectric combination layer are separated from each other in the body.

3. The head gimbal assembly according to claim 2, wherein all of the electrical pads are formed on the electrode layers and each of the electrode layers has at least one of the electrical pads.

4. The head gimbal assembly according to claim 3, wherein the distance between the electrical pad of one of the electrode layers of at least one electrode-piezoelectric combination layer and the corresponding electrical pad of the other electrode-piezoelectric combination layer of each PZT element is suitable for performing ball soldering or wire soldering.

5. The head gimbal assembly according to claim 1, wherein the electrical pads of the PZT mounting region comprises a first electrical connection pad, a second electrical connection pad and a common ground pad, one electrical pad of all the electrode-piezoelectric combination layers of one PZT element connects to the first electrical connection pad, the other electrical pad of all the electrode-piezoelectric combination layers of the one PZT element connects to the common ground pad; one electrical pad of all the electrode-piezoelectric combination layers of the other PZT element connects to the second electrical connection pad, the other electrical pad of all the electrode-piezoelectric combination layers of the other PZT element connects to the common ground pad.

6. The head gimbal assembly according to claim 5, wherein the electrical connection between the electrical pads is established by metal ball bonding.

7. The head gimbal assembly according to claim 1, wherein the electrical pads of the PZT mounting region comprises a first electrical connection pad and a second electrical connection pad, one electrical pad of all the electrode-piezoelectric combination layers of the two PZT elements connects to the first electrical connection pad, the other electrical pad of all the electrode-piezoelectric combination layers of the two PZT elements connects to the second electrical connection pad.

8. The head gimbal assembly according to claim 7, wherein the electrical connection between the electrical pads is established by metal ball bonding.

9. The head gimbal assembly according to claim 1, wherein outer sides of two ends of the PZT mounting region of the suspension respectively extend toward the slider mounting region to form a strength beam, the slider mounting region overhangs between the two side strength beams.

10. The head gimbal assembly according to claim 9, wherein a flexible arm is connected between the strength beam and the slider mounting region, the flexible arm has a first end portion connected with an end of the strength beam adjacent to the slider mounting region and a second end portion connected with the slider mounting region, the slider mounting region overhangs between the two second end portions, the flexible arm forms a curved portion between the first end portion and the second end portion.

11. The head gimbal assembly according to claim 10, wherein the curved portion is formed by multiple flexible sections bending in different direction, and the adjacent flexible sections are connected by an arc structure.

12. The head gimbal assembly according to claim 10, wherein the curved portion is U-shaped, V-shaped, arc-shaped, or curve-shaped.

13. An assembling method for a head gimbal assembly, comprising steps of:
providing a slider;
providing a PZT micro-actuator, wherein the micro-actuator comprises a pair of separate PZT elements and each PZT element has a body and a plurality of electrical pads, the body has at least two electrode-piezoelectric combination layers laminated together, the at least two electrode-piezoelectric combination layers are physically connected with but electrically isolated from each other, each electrode-piezoelectric combination layer has at least two of the electrical pads thereon, the electrical pads extend out from the body of the corresponding PZT element, and all the electrical pads of each PZT element are offset a predetermined distance therebetween;
providing a suspension for mounting the slider and the PZT micro-actuator, wherein the suspension comprises a flexure which has a tongue region, the tongue has a slider mounting region for mounting the slider and a PZT mounting region for mounting the PZT micro-actuator, the PZT mounting region forms a plurality of electrical pads;
mounting the two separate PZT elements of the PZT micro-actuator on the PZT mounting region of the suspension simultaneously and making the electrical pads of the PZT elements correspond to the electrical pads of the PZT mounting region, then bonding the corresponding electrical pads in one step or multiple steps via a soldering machine such that electrical connections between different electrode-piezoelectric combination layers of the PZT element and between the PZT element and the suspension are established at the same time; and,
mounting the slider on the slider mounting region of the suspension and electrically connecting the slider with the suspension.

14. The assembling method according to claim 13, wherein the electrical pads of the PZT mounting region comprises a first electrical connection pad, a second electrical connection pad and a common ground pad, and the step of mounting the two separate PZT elements of the PZT micro-actuator on the PZT mounting region of the suspension comprises: positioning one electrical pad of all the electrode-piezoelectric combination layers of one PZT element on the first electrical connection pad, positioning the other electrical pad of all the electrode-piezoelectric combination layers of the one PZT element on the common ground pad; positioning one electrical pad of all the electrode-piezoelectric combination layers of the other PZT element on the second electrical connection pad, positioning the other electrical pad of all the electrode-piezoelectric combination layers of the other PZT element on the common ground pad.

15. The assembling method according to claim 13, wherein the electrical pads of the PZT mounting region comprises a first electrical connection pad and a second electrical connection pad, the step of mounting the two separate PZT elements of the PZT micro-actuator on the PZT mounting region of the suspension comprises: positioning one electrical pad of all the electrode-piezoelectric combination layers of the two PZT elements on the first electrical connection pad, positioning the other electrical pad of all the electrode-piezoelectric combination layers of the two PZT elements on the second electrical connection pad.

16. A disk drive unit, comprising:
a head gimbal assembly;
a drive arm connected to the head gimbal assembly;
a disk; and
a spindle motor to spin the disk;
wherein the head gimbal assembly comprises:
a slider;
a PZT micro-actuator; and
a suspension to support the slider and the PZT micro-actuator, the suspension including a flexure which has a tongue region, the tongue region comprising a slider mounting region for mounting the slider and a PZT mounting region for mounting the PZT micro-actuator, the PZT mounting region forming a plurality of electrical pads;
wherein the PZT micro-actuator comprises:
a pair of separate PZT elements, each PZT element having a body and a plurality of electrical pads;
wherein the body has at least two electrode-piezoelectric combination layers laminated together, the electrode-piezoelectric combination layers are physically connected with but electrically isolated from each other, each electrode-piezoelectric combination layer has at least two of the electrical pads thereon, the electrical pads extend out from the body of the corresponding PZT element, and all the electrical pads of each PZT element are offset a predetermined distance therebetween;
wherein the pair of PZT elements are mounted in the PZT mounting region, the electrical pads of different electrode-piezoelectric combination layers of each PZT element as well as the electrical pads of different electrode-piezoelectric combination layers of each PZT element and the PZT mounting region are bonded correspondingly via a common soldering machine in one step or multiple steps such that electrical connections between different electrode-piezoelectric combination layers of the PZT element and between the PZT element and the suspension are established at the same time.

* * * * *